United States Patent Office 2,775,799
Patented Jan. 1, 1957

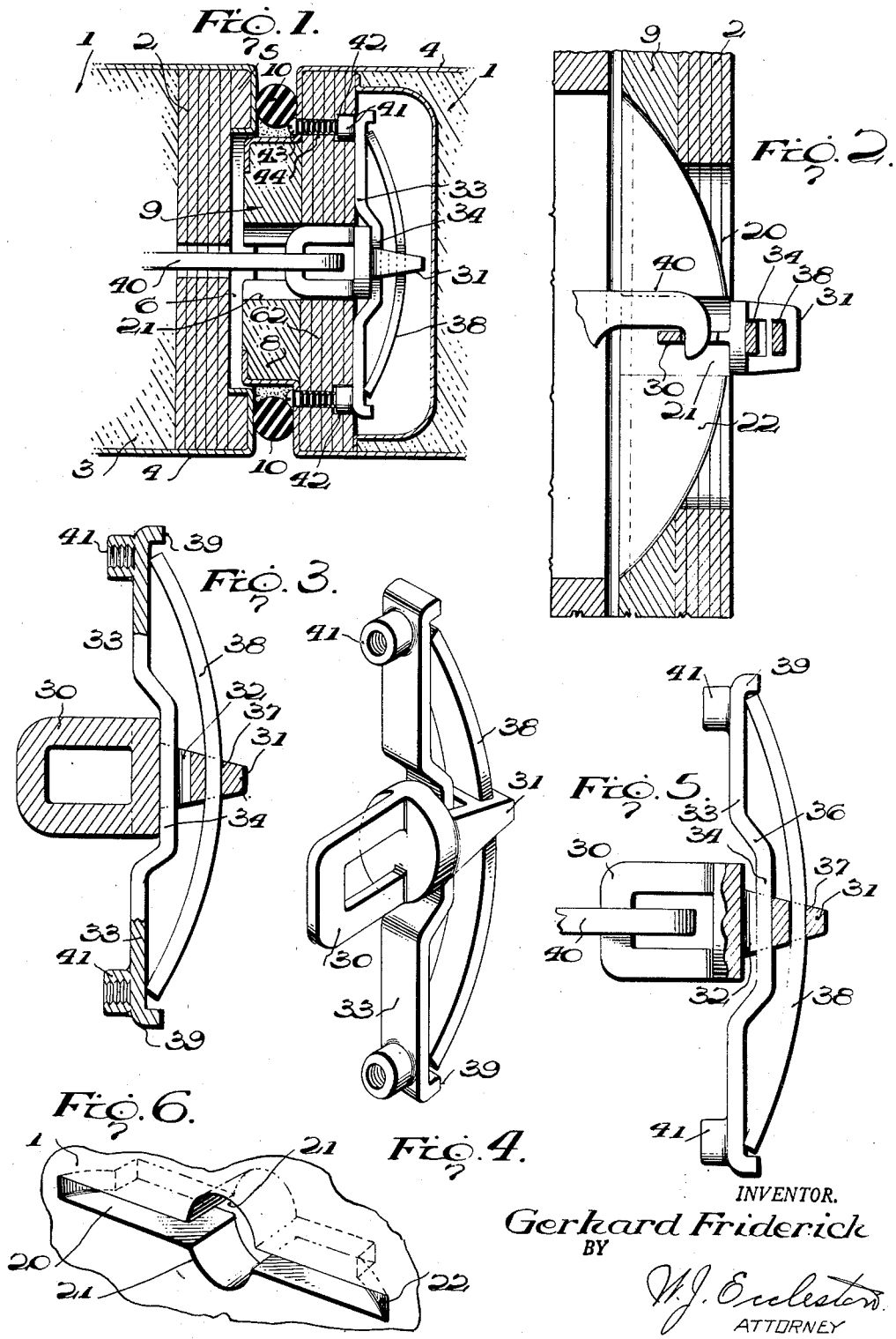

2,775,799
EYE OR KEEPER FOR HOOK AND EYE FASTENERS

Gerhard Friderich, Louisville, Ky., assignor to the United States of America as represented by the Secretary of the Army Application January 14, 1954, Serial No. 404,153

7 Claims. (Cl. 20—92.4)

(Granted under Title 35, U. S. Code (1952), sec. 266)

The invention described herein, if patented, may be manufactured and used by or for the Government for governmental purposes, without the payment to me of any royalty thereon.

This invention relates to fasteners of the hook and eye type, and particularly to such fasteners in which a resilient connection is provided so as to bias the connected elements toward each other.

A primary object of the invention resides in the provision of the eye or keeper portion of such a fastener which is so designed that it may be readily mounted in a confined space such as the edge of a prefabricated refrigerator panel or the like.

Another object of the invention consists in providing the eye portion and spring of such a fastener which is capable of being inserted in and removed through a slot in an edge of the element being fastened so as to avoid disturbing or marring the metal skin or other surface of the side of the panel.

A further object of the invention resides in the design of an eye assembly which may be inserted through a narrow slot in a panel edge, rotated through 90° and then secured in proper position by the insertion of a screw or the like in the edge of the panel.

A still further object of the invention consists in the provision of an eye assembly which is simple and inexpensive in manufacture and yet strong and durable in operation.

Other objects and advantages of the invention will be apparent from the following description when taken in connection with the accompanying drawings, in which, Figure 1 is a transverse sectional view through a joint between two of the panels in which the novel keeper assembly is mounted;

Figure 2 is a similar view taken at right angles to that shown in Figure 1;

Figure 3 is a sectional view through the keeper assembly per se;

Figure 4 is a perspective view of the keeper assembly;

Figure 5 is a plan view of the assembly with parts broken away; and,

Figure 6 is a fragmentary perspective view of the end of a panel showing the slots and passageways for the latching mechanism.

More specifically, the numeral 1 indicates generally a panel having ends formed of laminated wood or the like as indicated by the numeral 2, insulating material 3 and the whole enclosed by metal sheathing 4. The metal sheathing on one end of the panel may be bent over spaced strips 5, as indicated in Figure 1, so as to provide a groove 6; and the metal sheathing on the complementary end or edge of the adjacent panel may be bent over strip 8 to provide a tongue 9 to be received in the groove 6 of the adjacent panel. Gaskets 10 are disposed between the edges of the panel sections to form a seal when the sections are drawn together to cause the tongue 9 to enter the groove 6, as hereinafter described.

Panels of the type just described are to be drawn tightly together in sealing engagement as for instance when used in refrigerator constructions, and to this end it is usual to employ a hook and eye type of fastener in which means are provided for imparting a longitudinal movement to the hook after it engages its eye or keeper so as to form an airtight joint between the panel sections. The present invention relates to a novel type of spring-mounted keeper or eye for receiving the hook portion of such a fastener.

As heretofore mentioned, the panels are preferably covered by a sheathing of metal, and it is therefore highly desirable to provide a keeper which may be mounted in and also removed from the edge of the panel without in any way disturbing such metal sheathing. In the present instance the laminated structure 2 forming the edge of the panel is provided with a groove 20 of substantially the length of a base plate forming a part of the keeper assembly to be later described. The side walls of the slot 20, intermediate their ends, are provided with substantially semi-circular grooves 21 which together with the adjacent portion of the slot 20 provide a circular passageway in which the eye portion of the keeper assembly is mounted. Also the end 2 is provided with an arcuate groove 22 which provides for movement of the hook of the latch to engage its keeper.

The eye portion of the fastener of the present invention is indicated by the numeral 30 and is provided with an integral rearward extension 31. This extension is provided with a transverse opening 32 having substantial depth lengthwise of the extension 31 and receives a base plate 33 provided with an offset portion 34 which is situated within the opening, and shoulders 36 limit the extent of longitudinal movement of the base plate 33 with respect to the extension 31.

Beyond the transverse opening 32 in extension 31, or rearwardly thereof, is a transverse slot 37 which receives a curved leaf spring 38 having its free ends in contact with the back of the base plate 33, as indicated in the drawings. The free ends of the base plate are turned downwardly to form end flanges 39 which serve as limits to the outward movement of the ends of the leaf spring when a pulling force is applied to the eye 30 through operation of the hook 40 (Figures 2 and 5). Mounted on the ends of the base plate on the forward side thereof are nuts 41 fixed thereto by silver solder or the like which is less affected by cold than ordinary solder.

The parts being assembled in the manner indicated to form the keeper assembly, it is applied to the particular panel by aligning the parts 33 and 38 and passing them through the slot 20 of the panel until they have passed beyond the end 2 thereof. After the nuts have cleared the inner face of the end of the panel the entire assembly is rotated through 90° so as to bring the elements 33 and 38 into approximately the position shown in Figure 1 with the nuts 41 in alignment with recesses 42 formed in the inner face of the end 2 and spaced apart a distance corresponding to the spacing of the nuts 41 on the base 33. Thereafter the machine screws 43 are inserted in openings 44 formed in alignment with the openings 42 and threaded into the nuts 41 so as to secure the keeper assembly in position. Obviously this installation is made without in any way disturbing the metal sheathing 4, and, of course, the assembly can be removed with equal facility.

In the operation of the keeper assembly it will be apparent that the leaf spring 38 normally holds the eye portion 30 in its rearward or retracted position as indicated in Figures 1, 3 and 4. However, when the rotatably mounted hook 40, which may be operated in the manner shown in Hix Patent No. 453,004, is brought into engagement with the eye portion 30 and longitudinal movement thereafter imparted to the hook and eye portion 30 will be drawn forwardly, that is to the left, as indicated in the drawings, against the pressure of spring 38 which is caused to flatten out to the extent allowed by the flanges 39. This resiliency in the assembly of course applies very substantial pressure to the gaskets 10 between the abutting ends of the panels thereby forming an airtight seal at the juncture of the panels.

The assembly is quite simple and inexpensive to manufacture but nevertheless strong and durable in operation and is so designed as to permit of it being installed and removed as desired from the panels without in any way destroying or marring the faces of the panels which are ordinarily covered with aluminum sheathing or the like.

In accordance with the patent statutes I have described what I consider to be the preferred form of the invention, but inasmuch as various minor changes may be made in structural details without departing from the spirit of the invention, it is intended that all such changes be included within the scope of the appended claims.

I claim:

1. A keeper assembly for a hook type fastener comprising, an eye portion having a rearward extension provided with longitudinally spaced slots, a base plate extending through one of said slots, the depth of the slot in which the base plate is received being sufficient to permit of movement of the eye portion in a direction perpendicular to the base plate, a curved leaf spring extending through the other slot and having its ends in engagement with said base plate, and means on the base plate for receiving fastening means.

2. A keeper assembly for a hook type fastener comprising, an eye portion, an integral extension extending rearwardly of the eye portion, said extension being provided with two transverse slots spaced longitudinally thereof, one of said slots having substantial depth along the length of said extension, a base plate extending through said last-mentioned slot and having a thickness less than the depth of said slot, a curved leaf spring extending through the other slot and having its ends in engagement with the base plate, and means on the base plate for receiving fastening means.

3. A keeper assembly for a hook type fastener comprising, an eye portion, an integral extension extending rearwardly of the eye portion, said extension being provided with a pair of transverse slots in the plane of said eye, one of said slots having a substantial depth along the length of said extension, a base plate extending through said last-mentioned slot and having a thickness less than the depth of said slot, a curved leaf spring extending through the other slot and having its ends in engagement with the base plate, and means on the base plate for receiving fastening means.

4. A keeper assembly for a hook type fastener comprising, an eye portion having a rearward extension provided with longitudinally spaced slots, a base plate extending through one of said slots, end flanges on said base plate, a curved leaf spring extending through the other slot and having its ends in engagement with said base plate adjacent the end flanges, and means on the base plate for receiving fastening means.

5. In combination, a prefabricated panel having an elongated slot, substantially semi-circular grooves in the side walls of the slot to form a substantially circular passageway to the interior of the panel, a keeper assembly for a hook type fastener, said assembly including a spring-pressed eye portion mounted in the circular passageway and a base portion within the panel and extending transversely of the slot.

6. In combination, a prefabricated panel having an elongated slot, substantially semi-circular grooves in the side walls of the slot to form a substantially circular passageway to the interior of the panel, a keeper assembly for a hook type fastener, said assembly including an eye portion mounted in the circular passageway, a rearward extension on said eye portion provided with a transverse opening, and a base plate extended through the opening of said extension and positioned transversely of the slot in the panel.

7. In combination, a prefabricated panel having an elongated slot, substantially semi-circular grooves in the side walls of the slot to form a substantially circular passageway to the interior of the panel, a keeper assembly for a hook type fastener, said assembly including an eye portion mounted in the circular passageway, a rearward extension on said eye portion provided with a transverse opening, said opening having substantial depth lengthwise of the extension, a base plate extended through the opening and positioned transversely of the slot in the panel and having a thickness less than the depth of the slot, thereby permitting movement of the eye normal to the base plate, and a spring for biasing the eye into a rearward position.

References Cited in the file of this patent

UNITED STATES PATENTS

| 1,250,574 | Ferris | Dec. 18, 1917 |
| 2,340,864 | Carpenter | Feb. 8, 1944 |

FOREIGN PATENTS

| 77,088 | Switzerland | Nov. 12, 1917 |
| 561,248 | Germany | Oct. 12, 1932 |